(12) United States Patent
Yamada et al.

(10) Patent No.: US 12,175,417 B2
(45) Date of Patent: Dec. 24, 2024

(54) MANAGEMENT SYSTEM, SERVER APPARATUS, STORAGE APPARATUS, AND MANAGEMENT METHOD

(71) Applicant: KYOCERA Corporation, Kyoto (JP)

(72) Inventors: Yuki Yamada, Yokohama (JP); Takaomi Araki, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 17/936,180

(22) Filed: Sep. 28, 2022

(65) Prior Publication Data

US 2023/0013397 A1    Jan. 19, 2023

Related U.S. Application Data

(63) Continuation of application No. PCT/JP2021/010273, filed on Mar. 15, 2021.

(30) Foreign Application Priority Data

Mar. 30, 2020 (JP) ................................. 2020-061497

(51) Int. Cl.
*G06Q 10/0836* (2023.01)
*G06Q 30/0283* (2023.01)

(52) U.S. Cl.
CPC ..... *G06Q 10/0836* (2013.01); *G06Q 30/0284* (2013.01)

(58) Field of Classification Search
CPC ........................ G06Q 10/0836; G06Q 30/0284
USPC .......................................................... 705/339
See application file for complete search history.

(56) References Cited

U.S. PATENT DOCUMENTS

| 2002/0035515 | A1* | 3/2002 | Moreno ............... | B65G 1/0485 340/5.73 |
| 2013/0307382 | A1* | 11/2013 | Garrison ................ | G07F 9/001 312/215 |
| 2018/0040073 | A1* | 2/2018 | Ghosh .................. | G06Q 20/207 |
| 2019/0244143 | A1 | 8/2019 | Habuta | |

FOREIGN PATENT DOCUMENTS

| JP | 2018-072885 A | 5/2018 |
| JP | 2019-005281 A | 1/2019 |
| JP | 2019-037389 A | 3/2019 |
| JP | 2019-139744 A | 8/2019 |

OTHER PUBLICATIONS

"Hyperconnected City Logistics: Smart Lockers Terminals &Last Mile Delivery Networks" Published by IPIC (Year: 2016).*

* cited by examiner

*Primary Examiner* — Zeina Elchanti
(74) *Attorney, Agent, or Firm* — Studebaker & Brackett PC

(57) ABSTRACT

A management system includes a storage apparatus including at least one storage box that stores an article, a server apparatus that manages the storage apparatus, and a controller provided in the storage apparatus or the server apparatus. The at least one storage box is shared by business operators of a plurality of types of businesses. The controller switches, based on a type of business of a business operator using the at least one storage box, at least one of a function to be enabled out of a plurality of functions included in the at least one storage box or a configuration in the function to be enabled.

14 Claims, 12 Drawing Sheets

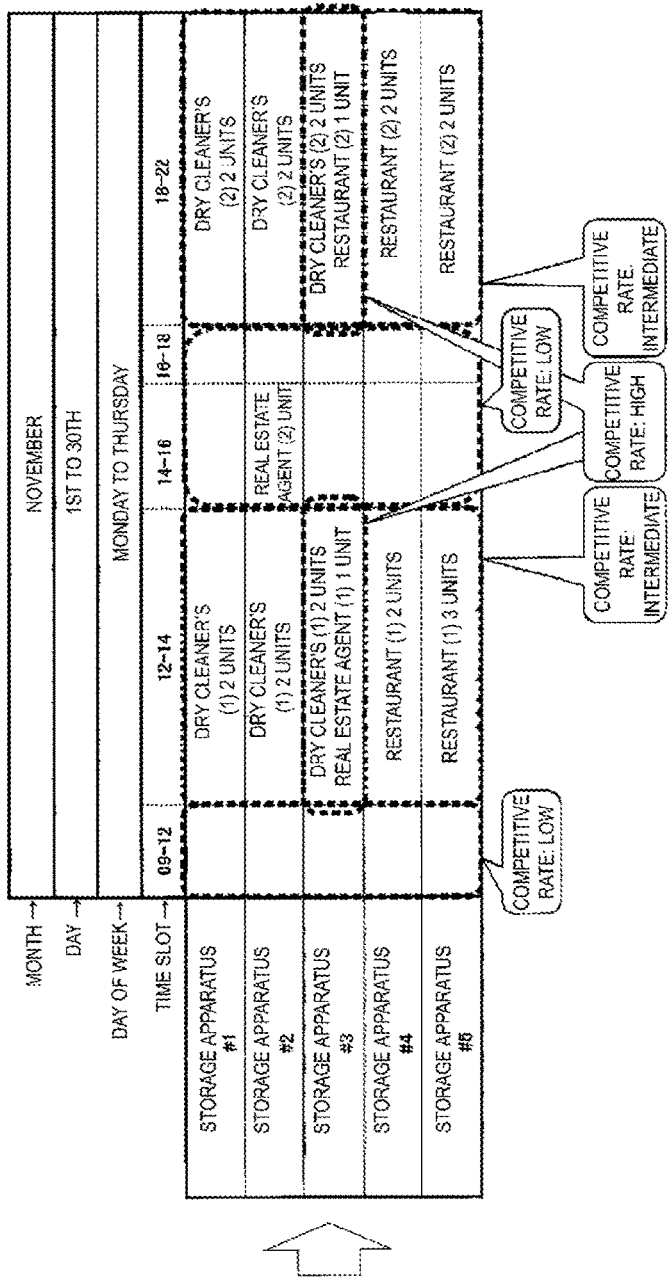

FIG.8A

NOVEMBER 2019

| SUNDAY | MONDAY | TUESDAY | WEDNESDAY | THURSDAY | FRIDAY | SATURDAY |
|---|---|---|---|---|---|---|
| 27 | 28 | 29 | 30 | 31 | 1 | |
| 3 | 4 | 5 | 6 | 7 | 8 | 9 |
| 10 | 11 | 12 | 13 | 14 | 15 | 16 |
| 17 | 18 | 19 | 20 | 21 | 22 | 23 |
| 24 | 25 | 26 | 27 | 28 | 29 | 30 |

1 UNIT

1 UNIT
2 UNITS
3 UNITS
4 UNITS
5 UNITS
6 UNITS
:

FIG.8D

RESTAURANT

RESTAURANT
DRY CLEANER'S
REAL ESTATE AGENT
COURIER SERVICE PROVIDER
OTHER

| | DETECTION FUNCTION | TEMPERATURE CONDITIONING FUNCTION | DISPLAY FUNCTION |
|---|---|---|---|
| (A) COURIER SERVICE BUSINESS OPERATOR | ON (DETECTION CONFIGURATION #1) | OFF | ON (DISPLAY CONFIGURATION #1) |
| (B) DRY CLEANING BUSINESS OPERATOR | ON (DETECTION CONFIGURATION #2) | OFF | ON (DISPLAY CONFIGURATION #2) |
| (C) RESTAURANT BUSINESS OPERATOR | ON (DETECTION CONFIGURATION #3) | ON | ON (DISPLAY CONFIGURATION #3) |
| (D) REAL ESTATE BUSINESS OPERATOR | ON (DETECTION CONFIGURATION #4) | OFF | ON (DISPLAY CONFIGURATION #4) |

FIG. 10

MANAGEMENT SYSTEM, SERVER APPARATUS, STORAGE APPARATUS, AND MANAGEMENT METHOD

RELATED APPLICATIONS

The present application is a continuation based on PCT Application No. PCT/JP2021/010273, filed on Mar. 15, 2021, which claims the benefit of Japanese Patent Application No. 2020-061497 filed on Mar. 30, 2020. The content of which is incorporated by reference herein in their entirety.

TECHNICAL FIELD

The present invention relates to a management system, a server apparatus, a storage apparatus, and a management method.

BACKGROUND ART

Patent Literature 1 describes a system including a storage apparatus that stores an article in a storage box and temporarily keeps the article, a server apparatus that manages information in the storage apparatus, and a delivery person's terminal of a delivery person who delivers the article, in which the server apparatus transmits information of a storage status and a reservation status of the storage box to the delivery person's terminal.

In the system, when the server apparatus receives information indicating a request for reservation of the storage box of the storage apparatus from the delivery person's terminal, the server apparatus performs reservation processing regarding the storage box for which the reservation is requested and locks the storage box and prohibits entry of articles.

CITATION LIST

Patent Literature

Patent Literature 1: Japanese application publication No. 2018-72885

SUMMARY OF INVENTION

A management system according to a first aspect includes a storage apparatus including at least one storage box that stores an article, a server apparatus that manages the storage apparatus, and a controller provided in the storage apparatus or the server apparatus. The at least one storage box is shared by business operators of a plurality of types of businesses. The controller switches, based on a type of business of a business operator using the at least one storage box, at least one of a function to be enabled out of a plurality of functions included in the at least one storage box or a configuration in the function to be enabled.

A server apparatus according to a second aspect includes a controller that manages a storage apparatus including at least one storage box that stores an article. The at least one storage box is shared by business operators of a plurality of types of businesses. The controller switches, based on a type of business of a business operator using the at least one storage box, at least one of a function to be enabled out of a plurality of functions included in the at least one storage box or a configuration in the function to be enabled.

A storage apparatus according to a third aspect includes at least one storage box that stores an article, and a controller. The at least one storage box is shared by business operators of a plurality of types of businesses. The controller switches, based on a type of business of a business operator using the at least one storage box, at least one of a function to be enabled out of a plurality of functions included in the at least one storage box or a configuration in the function to be enabled.

A management method according to a fourth aspect is a method used for a management system including a storage apparatus including at least one storage box that stores an article, a server apparatus that manages the storage apparatus, and a controller provided in the server apparatus or the storage apparatus. The at least one storage box is shared by business operators of a plurality of types of businesses. The controller switches, based on a type of business of a business operator using the at least one storage box, at least one of a function to be enabled out of a plurality of functions included in the at least one storage box or a configuration in the function to be enabled.

BRIEF DESCRIPTION OF DRAWINGS

FIGS. 7A and 7B are a diagram illustrating an example of regular reservation according to an embodiment.

FIGS. 8A to 8D are a diagram illustrating an example of irregular advance reservation according to an embodiment.

FIG. 10 is a diagram illustrating an example of a function switch table according to an embodiment.

DESCRIPTION OF EMBODIMENTS

The system described in Patent Literature 1 assumes a case in which a courier service business operator reserves storage boxes; however, the storage boxes may be used not only by courier service businesses but also by business operators of various types of businesses, such as a dry cleaning business, a catering and restaurant business, and a real estate business.

Here, it is contemplated that there is a case in which functions required for the storage boxes differ depending on the type of business of a user using the storage boxes. Under such an assumption, individual dedicated storage boxes may need to be installed for each type of business, and accordingly there is concern that the number of storage boxes to be installed increases and use efficiency of the storage boxes reduces.

In view of this, the present disclosure has an object to enable efficient use of storage boxes even in a case where business operators of various types of businesses use the storage boxes.

Embodiments will be described with reference to the drawings. In the description of the drawings, the same or similar parts are denoted by the same or similar reference signs.

Configuration of Management System

Figure 1:
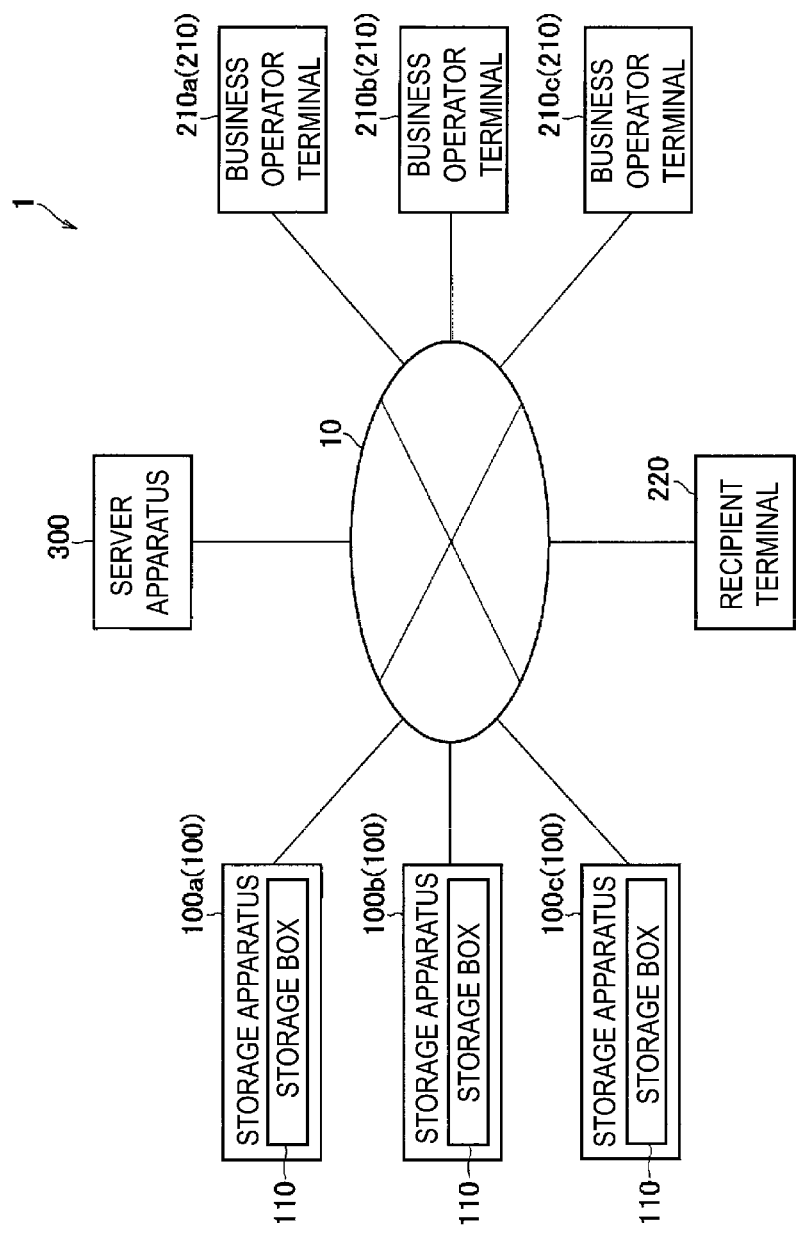
FIG. 1 is a diagram illustrating a configuration of a management system according to an embodiment.

First, a configuration of a management system according to an embodiment will be described. FIG. 1 is a diagram illustrating a configuration of a management system 1 according to an embodiment.

As illustrated in FIG. 1, the management system 1 includes a plurality of storage apparatuses 100 (storage apparatuses 100a to 100c), a plurality of business operator terminals 210 (business operator terminals 210a to 210c), a recipient terminal 220, and a server apparatus 300. Note that, in FIG. 1, an example in which the number of storage apparatuses 100 and the number of business operator terminals 210 are each three is illustrated; however, the number may be one, two, or four or more. An example in which the number of recipient terminals 220 is one is illustrated; however, the number may be two or more.

Each storage apparatus 100 is an apparatus including a storage box(es) 110 that stores an article. Each storage apparatus 100 includes at least one storage box 110. Each storage apparatus 100 communicates with the server apparatus 300 via a network 10. Each storage apparatus 100 is installed in a predetermined facility. For example, the facility in which the storage apparatus 100 is installed may be a public place such as a station, may be a commercial facility, or may be a housing complex such as an apartment house or a condominium.

Each storage box 110 has a plurality of functions. Such a plurality of functions include at least one of a detection function of detecting presence or absence of an article stored in the storage box 110, a temperature conditioning function of conditioning temperature in the storage box 110, or a display function of displaying information.

Each business operator terminal 210 is a terminal apparatus belonging to a different business operator. The business operator is an entity using the storage apparatus 100 (storage box 110). Specifically, the business operator is an entity that reserves the storage box 110 and then stores an article in the storage box 110. For example, the business operator is at least one of a courier service business operator, a dry cleaning business operator, a restaurant business operator, or a real estate business operator.

Each business operator terminal 210 communicates with the server apparatus 300 via the network 10. Each business operator terminal 210 is, for example, a personal computer (PC), a smartphone, a tablet terminal, or a wearable terminal. The business operator terminal 210 performs reservation processing of the storage box 110 for the server apparatus 300.

The recipient terminal 220 is a terminal apparatus belonging to a recipient using the storage apparatus 100 (storage box 110). The recipient terminal 220 communicates with the server apparatus 300 via the network 10. The recipient terminal 220 is, for example, a PC, a smartphone, a tablet terminal, or a wearable terminal. The recipient receives the article stored in the storage box 110.

The server apparatus 300 is an apparatus that manages and controls the storage apparatus 100. The server apparatus 300 communicates with each storage apparatus 100, each business operator terminal 210, and the recipient terminal 220 via the network 10. The server apparatus 300 manages reservation for each storage box 110 of each storage apparatus 100 and manages the latest status of each storage box 110 of each storage apparatus 100, for example.

For example, firstly, after the storage box 110 is reserved in response to a reservation request from the business operator terminal 210, the server apparatus 300 locks the reserved storage box 110 and notifies the recipient terminal 220 that the storage box 110 has been reserved, through electronic mail or the like. Secondly, the server apparatus 300 detects that the business operator has opened a door of the reserved storage box 110, stored an article, and closed the door. Thirdly, the server apparatus 300 locks the storage box 110, and notifies the recipient terminal 220 that the article has been stored in the storage box 110, through electronic mail or the like.

In the management system 1 configured as described above, each storage box 110 is shared by business operators of a plurality of types of businesses. Such a plurality of types of businesses deal with articles different from each other.

The server apparatus 300 switches at least one of a function to be enabled out of the plurality of functions of the storage box 110 reserved by the business operator or a configuration in the function to be enabled, based on the type of business of the business operator that has reserved the storage box 110.

With this, even when business operators of various types of businesses share the storage boxes 110, the storage boxes 110 can be efficiently used. Specifically, individual dedicated storage boxes need not be installed for each type of business, and accordingly increase of the number of storage boxes 110 to be installed can be prevented, and at the same time, use efficiency of the storage boxes 110 can be enhanced.

Configuration of Storage Apparatus

Figure 2:
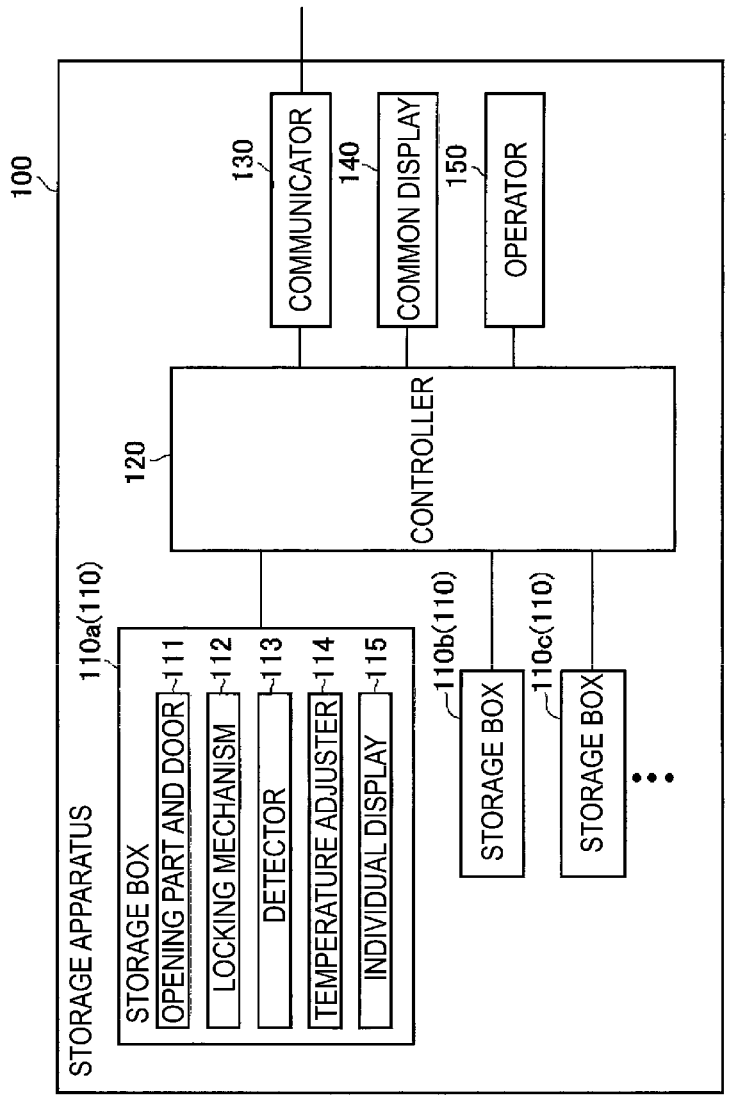
FIG. 2 is a diagram illustrating a configuration of a storage apparatus according to an embodiment.

Next, a configuration of the storage apparatus 100 according to an embodiment will be described. FIG. 2 is a diagram illustrating a configuration of the storage apparatus 100 according to an embodiment.

As illustrated in FIG. 2, the storage apparatus 100 includes a plurality of storage boxes 110 (storage boxes 110a, 110b, 110c, . . . ), a controller 120, a communicator 130, a common display 140, and an operator 150. In FIG. 2, an example in which the number of storage boxes 110 is more than one is illustrated; however, the number of storage boxes 110 may be one.

Each storage box 110 includes an opening part and door 111, a locking mechanism 112, a detector 113, a temperature adjuster 114, and an individual display 115.

The opening part and door 111 includes an opening part that allows storage or retrieval of an article, and a door that closes the opening part. The locking mechanism 112 is a mechanism that locks the door under control of the controller 120.

The detector 113 detects presence or absence of an article stored in the storage box 110, and outputs detection results to the controller 120. For example, the detector 113 includes a weight sensor that measures weight of the article stored in the storage box 110. The detector 113 may include a sensor (for example, an infrared sensor or an ultrasonic sensor) that detects presence or absence of an article stored in the storage box 110, in addition to the weight sensor or instead of the weight sensor.

The temperature adjuster 114 adjusts temperature in the storage box 110 under control of the controller 120. The temperature adjuster 114 includes a heating mechanism for raising temperature in the storage box 110. The temperature adjuster 114 may include a cooling mechanism for lowering temperature in the storage box 110, in addition to the heating mechanism or instead of the heating mechanism. The temperature adjuster 114 may include a measuring mechanism for measurement of temperature in the storage box 110, in addition to the heating mechanism or the cooling mechanism.

The individual display 115 displays information under control of the controller 120. The individual display 115 may be provided on the front surface of the door of the storage box 110. The individual display 115 may be, for example, a liquid crystal display, an organic EL display, or electronic paper.

The controller 120 controls the storage box 110, the communicator 130, the common display 140, and the operator 150. The controller 120 includes at least one processor and at least one memory electrically connected to the processor. For example, the controller 120 controls locking and unlocking of the storage box 110 according to an instruction that the communicator 130 receives from the server apparatus 300. The controller 120 controls the communicator 130 to transmit an open and close status of the door of the storage box 110, the detection results of the detector 113, details of operation performed on the operator 150, and the like to the server apparatus 300.

The communicator 130 performs communication with the server apparatus 300. The communicator 130 includes a communication interface connected to the network 10 in a wired or wireless manner. The common display 140 displays various pieces of information under control of the controller 120. The operator 150 receives operation from a business operator or a recipient. The common display 140 and the operator 150 may be integrated as a touch panel display.

Configuration of Server Apparatus

Figure 3:
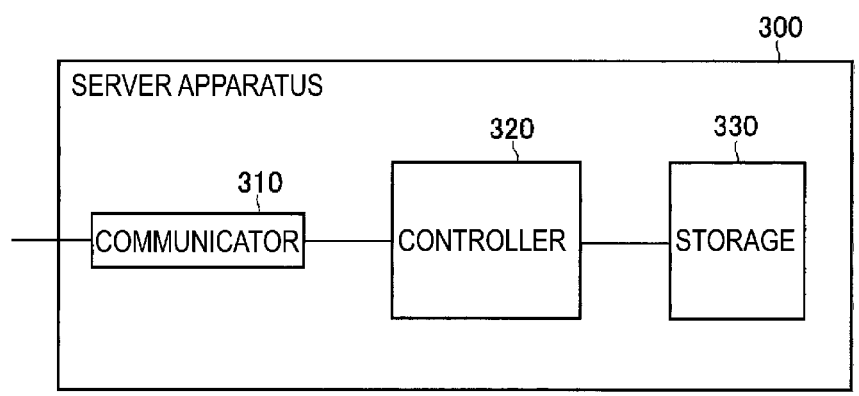
FIG. 3 is a diagram illustrating a configuration of a server apparatus according to an embodiment.

Next, a configuration of the server apparatus 300 according to an embodiment will be described. FIG. 3 is a diagram illustrating a configuration of the server apparatus 300 according to an embodiment.

As illustrated in FIG. 3, the server apparatus 300 includes a communicator 310, a controller 320, and a storage 330.

The communicator 310 performs communication with each storage apparatus 100, each business operator terminal 210, and the recipient terminal 220. The communicator 310 includes a communication interface connected to the network 10 in a wired or wireless manner. For example, the communicator 310 transmits an instruction such as a lock instruction or an unlock instruction to the storage apparatus 100. The communicator 310 receives an open and close status of the door of the storage box 110, the detection results of the detector 113, and details of operation performed on the operator 150 from the storage apparatus 100.

The controller 320 controls the communicator 310 and the storage 330, and executes various types of information processing, based on information received by the communicator 310 and information stored in the storage 330. The controller 320 includes at least one processor. The storage 330 includes at least one memory. The storage 330 may include at least one auxiliary storage apparatus. The storage 330 stores storage apparatus information and reservation information under control of the controller 320.

Figure 4:
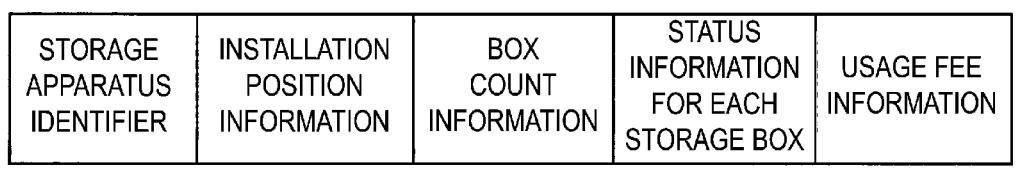
FIG. 4 is a diagram illustrating an example of storage apparatus information according to an embodiment.

The storage apparatus information is information managed by the controller 320 for each storage apparatus 100. FIG. 4 is a diagram illustrating an example of the storage apparatus information according to an embodiment.

As illustrated in FIG. 4, the storage apparatus information includes a storage apparatus identifier, installation position information, box count information, status information for each storage box 110, and usage fee information.

The storage apparatus identifier is an identifier for identifying the storage apparatus 100.

The installation position information is information indicating an installation position (including an address) of the storage apparatus 100.

The box count information is information indicating the number of storage boxes 110 of the storage apparatus 100.

The status information for each storage box 110 is information (status information) indicating a status of each storage box 110. The status of the storage box 110 is determined depending on whether an article is stored in the storage box 110 and whether the storage box 110 is reserved. Whether an article is stored in the storage box 110 is determined depending on the open and close status of the door of the storage box 110 and the detection results of the detector 113.

When there is no article stored in the storage box 110 and the storage box 110 is not reserved, the status of the storage box 110 is reservable (that is, available). Otherwise, the status of the storage box 110 is not reservable. When the storage box 110 is reserved, an article is stored in the storage box 110, and the article is retrieved from the storage box 110, the controller 320 updates the status information.

The usage fee information is information indicating a usage fee of the storage apparatus 100. The usage fee is charged to the business operator that has used the storage apparatus 100 (storage box 110).

The controller 320 calculates a usage rate for each storage apparatus 100, based on a usage status of the storage apparatus 100. The usage status is, for example, determined according to the status information, and includes a reservation record and a usage record of each storage apparatus 100. Such a usage rate is an index indicating a rating of each storage apparatus 100 and is hereinafter referred to as a competitive rate. The competitive rate may be calculated for each storage box 110 or may be calculated on a time-by-time basis (whether the day is a weekday, for each day of the week, and/or for each time slot).

The controller 320 sets the usage fee of each storage apparatus 100, based on the calculated competitive rate. For example, the controller 320 sets a high usage fee to the storage apparatus 100 having a high competitive rate and sets a low usage fee to the storage apparatus 100 having a low competitive rate. The usage fee may be set for each storage box 110 or may be set on a time-by-time basis (whether the day is a weekday, the day of the week, and/or a time slot).

Figure 5:
FIG. 5 is a diagram illustrating an example of reservation information according to an embodiment.

The reservation information is information indicating details of each reservation. The controller 320 manages the reservation information, based on a reservation request that the communicator 310 receives from the business operator terminal 210. FIG. 5 is a diagram illustrating an example of the reservation information according to an embodiment.

As illustrated in FIG. 5, the reservation information includes a reservation number, reservation type information, business type information, reserved box information, and reservation time information.

The reservation number is a number (identifier) for identifying a reservation.

The reservation type information is information indicating a type of reservation. In an embodiment, there are three types of reservations, specifically, (1) regular reservation, (2) irregular advance reservation, and (3) irregular instantaneous reservation. In the regular reservation, one or a plurality of storage boxes 110 are continuously reserved in a certain time slot for a certain period of time. In the irregular advance reservation, one or a plurality of storage boxes 110 are reserved irregularly and in advance. In the irregular instantaneous reservation, one or a plurality of storage boxes 110 are reserved irregularly and instantaneously.

The business type information is information indicating a type of business of a business operator that has made a reservation. In an embodiment, there are four types of businesses, specifically, a courier service business operator, a dry cleaning business operator, a restaurant business operator, and a real estate business operator.

The reserved box information is information indicating the storage apparatus 100 and the storage box 110 being reserved.

The reservation time information is information indicating a date and time and a time slot for which a reservation is made.

In an embodiment, the controller 320 controls reservation operation of the storage box 110 and function switch operation of the storage box 110.

The reservation operation of the storage box 110 is operation of reserving the storage box 110 in response to a reservation request that the communicator 310 receives from the business operator terminal 210. As described above, there are three types of reservations, specifically, the regular reservation, the irregular advance reservation, and the irregular instantaneous reservation.

The function switch operation of the storage box 110 is operation of performing function switch of the storage box 110 regarding the reserved time slot, based on the type of business of the business operator that has reserved the storage box 110. Specifically, the controller 320 switches at least one of a function to be enabled out of a plurality of functions of the reserved storage box 110 or a configuration in the function to be enabled.

As described above, the plurality of functions of the storage box 110 include at least one of the detection function (function of the detector 113) of detecting presence or absence of an article stored in the storage box 110, the temperature conditioning function (function of the temperature adjuster 114) of conditioning temperature in the storage box 110, or the display function (function of the individual display 115) of displaying information.

The controller 320 may switch a configuration related to the detection function (detector 113) of the storage box 110, based on the type of business of the business operator that has reserved the storage box 110. With this, optimal detection operation can be performed for the article dealt with by the business operator.

For example, the controller 320 switches a configuration of a detection threshold value for detecting presence or absence of the article by using a weight measurement function (weight sensor) of the detector 113, based on the type of business of the business operator that has reserved the storage box 110. Specifically, the controller 320 sets the detection threshold value to be lower as the article dealt with by the business operator is lighter. In contrast, the controller 320 sets the detection threshold value to be higher as the article dealt with by the business operator is heavier. With this, occurrence of misdetection can be prevented, and a light article can be appropriately detected as well.

When the business operator is a real estate business operator, a use case in which the storage box 110 is used for handing over of a key is assumed. In such a case, the controller 320 sets the detection threshold value to be low.

The controller 320 may switch whether to enable the temperature conditioning function (temperature adjuster 114) of the storage box 110, based on the type of business of the business operator that has reserved the storage box 110. With this, whether temperature is adjusted can be appropriately set depending on the article dealt with by the business operator.

For example, when the type of business of the business operator that has reserved the storage box 110 is a type of business that deals with food as an article (i.e., a restaurant business operator), the controller 320 sets to enable the temperature conditioning function. When the business operator is a restaurant business operator, a use case in which the storage box 110 is used for handing over of a box lunch or delivery food is assumed. In such a case, the controller 320 sets to enable the temperature conditioning function (for example, a heating or heat retaining function).

The controller 320 may switch display configuration in the display function (individual display 115) of the storage box 110, based on the type of business of the business operator that has reserved the storage box 110. For example, the controller 320 switches the display configuration to allow display of identification information indicating the type of business of the business operator that has reserved the storage box 110. Because one storage box 110 is shared by a plurality of business operators (plurality of purposes), the recipient may not know for what purpose the storage box 110 is currently used. Thus, display that indicates the current purpose of each storage box 110 is performed.

Example of Reservation Operation of Storage Box

Figure 6:
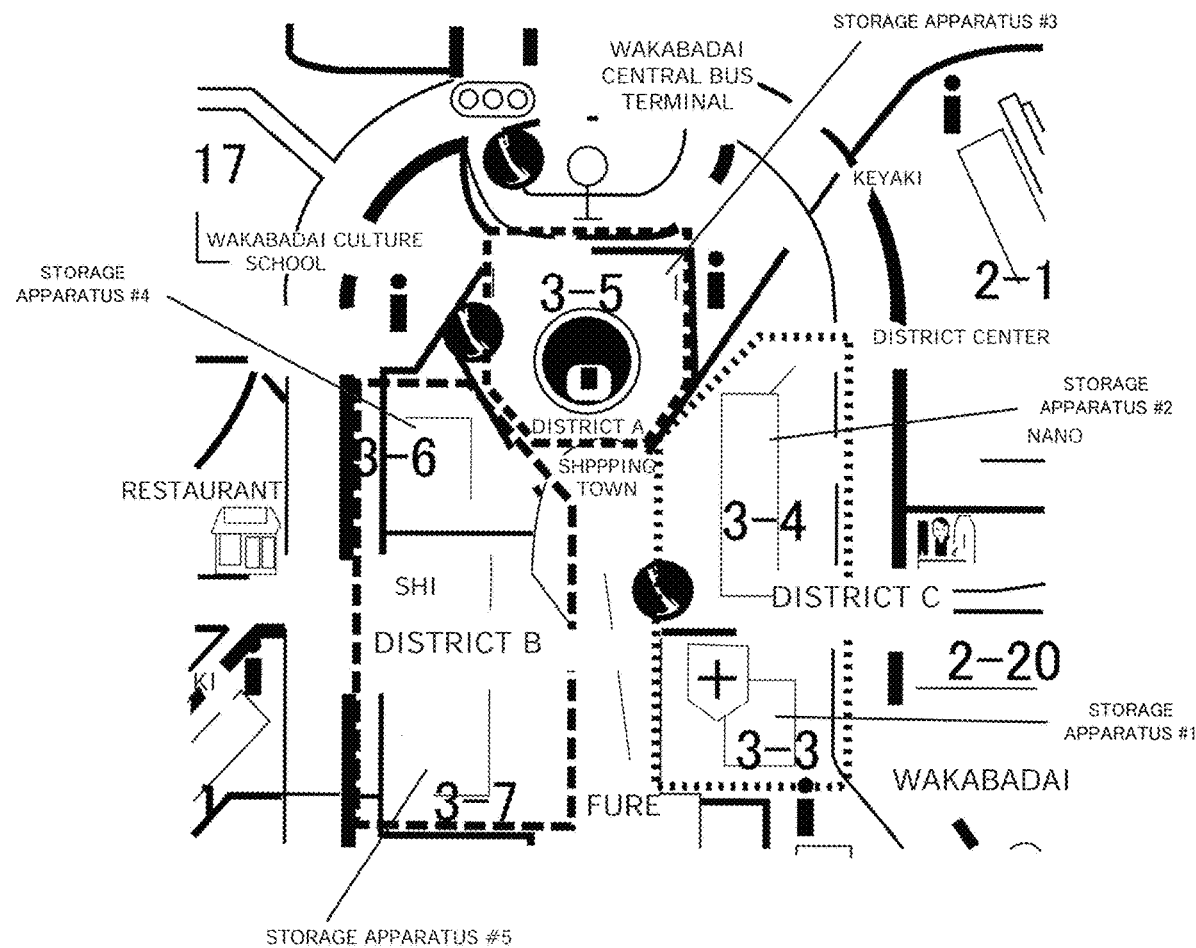
FIG. 6 is a diagram illustrating an example of an operation environment according to an embodiment.

Next, an example of reservation operation of the storage box 110 according to an embodiment will be described. FIG. 6 is a diagram illustrating an example of an operation environment according to an embodiment.

As illustrated in FIG. 6, there are three districts, specifically, district A, district B, and district C, and five storage apparatuses 100 (storage apparatuses #1 to #5). Storage apparatuses #1 and #2 are installed in district C. Storage apparatus #3 is installed in district A. Storage apparatuses #4 and #5 are installed in district B.

(1) Example of Regular Reservation

FIGS. 7A and 7B are a diagram illustrating an example of the regular reservation according to an embodiment. In the regular reservation, one or a plurality of storage boxes 110 are continuously reserved in a certain time slot for a certain period of time. Here, it is assumed that the certain period of time is a whole month of November. Note that it is assumed that the days of the week are from Monday to Thursday.

As illustrated in FIG. 7A, the server apparatus 300 receives reservation request #1 from the business operator terminal 210 belonging to a restaurant being a restaurant business operator, reservation request #2 from the business operator terminal 210 belonging to the restaurant, reservation request #3 from the business operator terminal 210 belonging to a dry cleaner's being a dry cleaning business operator, reservation request #4 from the business operator terminal 210 belonging to the dry cleaner's, reservation request #5 from the business operator terminal 210 belonging to a real estate agent being a real estate business operator, and reservation request #6 from the business operator terminal 210 belonging to the real estate agent.

The detail of reservation request #1 is a request for reservation of five (five units of) storage boxes 110 present in district B in the time slot from 12:00 to 14:00.

The detail of reservation request #2 is a request for reservation of five (five units of) storage boxes 110 present in district A and district B in the time slot from 18:00 to 21:00.

The detail of reservation request #3 is a request for reservation of six (six units of) storage boxes 110 present in district A and district C in the time slot from 12:00 to 14:00.

The detail of reservation request #4 is a request for reservation of six (six units of) storage boxes 110 present in district A and district C in the time slot from 18:00 to 21:00.

The detail of reservation request #5 is a request for reservation of one (one unit of) storage box 110 present in district A in the time slot from 12:00 to 14:00.

The detail of reservation request #6 is a request for reservation of one (one unit of) storage box 110 present in district C in the time slot from 14:00 to 16:00.

The server apparatus 300 reserves the storage boxes 110 as illustrated in FIG. 7B, based on reservation requests #1 to #6 as described above.

As illustrated in FIG. 7B, in the time slot from 12:00 to 14:00, the server apparatus 300 reserves two (two units of) storage boxes 110 of storage apparatus #1, two (two units of) storage boxes 110 of storage apparatus #2, and two (two units of) storage boxes 110 of storage apparatus #3 for the dry cleaner's. In the time slot from 12:00 to 14:00, the server apparatus 300 reserves one (one unit of) storage box 110 of storage apparatus #3 for the real estate agent, and two (two units of) storage boxes 110 of storage apparatus #4 and three (three units of) storage boxes 110 of storage apparatus #5 for the restaurant.

In the time slot from 14:00 to 16:00, the server apparatus 300 reserves two (two units of) storage boxes 110 of storage apparatus #2 for the real estate agent.

In addition, in the time slot from 18:00 to 21:00, the server apparatus 300 reserves two (two units of) storage boxes 110 of storage apparatus #1, two (two units of) storage boxes 110 of storage apparatus #2, and two (two units of) storage boxes 110 of storage apparatus #3 for the dry cleaner's. In the time slot from 18:00 to 21:00, the server apparatus 300 reserves one (one unit of) storage box 110 of storage apparatus #3, two (two units of) storage boxes 110 of storage apparatus #4, and two (two units of) storage boxes 110 of storage apparatus #5 for the restaurant.

In this manner, in the regular reservation, when a business operator loosely specifies areas (districts), the server apparatus 300 automatically reserves the storage boxes 110 present in the specified areas.

Here, when the server apparatus 300 receives a reservation request with a specified area(s) from a business operator of any one of the types of businesses and two or more storage apparatuses 100 are installed in the area(s), the server apparatus 300 may preferentially reserve the storage box(es) 110 of the storage apparatus 100 having a low competitive rate out of the two or more storage apparatuses 100. In other words, the server apparatus 300 preferentially reserves the storage box 110 having a low usage fee out of the plurality of storage boxes 110 present in the specified area(s). With this, use efficiency of the storage boxes 110 can be enhanced, and also an economic burden on the business operator can be reduced.

(2) Example of Irregular Advance Reservation

FIGS. 8A to 8D are a diagram illustrating an example of the irregular advance reservation according to an embodiment. In the irregular advance reservation, one or a plurality of storage boxes 110 are reserved irregularly and in advance. Here, it is assumed that the details of the reservation requested from the business operator terminal 210 belonging to the dry cleaner's to the server apparatus 300 are "number of units: 3, place: storage apparatus #2, time slot: 09:00 to 12:00 on Saturday, November 2".

The business operator terminal 210 receives operation of specifying Saturday, November 2 as illustrated in FIG. 8A, receives operation of specifying time slot: 09:00 to 12:00 as illustrated in FIG. 8B, receives operation of specifying the number of units: 3 as illustrated in FIG. 8C, and receives operation of specifying type of business: dry cleaner's as illustrated in FIG. 8D. The business operator terminal 210 receives operation of specifying place: storage apparatus #2. The business operator terminal 210 transmits a reservation request including these reservation details to the server apparatus 300. The server apparatus 300 reserves three (three units of) storage boxes 110 of storage apparatus #2, according to the reservation details specified in the reservation request from the business operator terminal 210. Note that it is assumed that the storage boxes 110 already reserved cannot be reserved.

Note that specifying a specific storage apparatus may be changed to specifying a specific area (district). In this case, the server apparatus 300 may preferentially reserve the storage box(es) 110 having a low usage fee out of the plurality of storage boxes 110 present in the specified area.

(3) Example of Irregular Instantaneous Reservation

Figure 9:
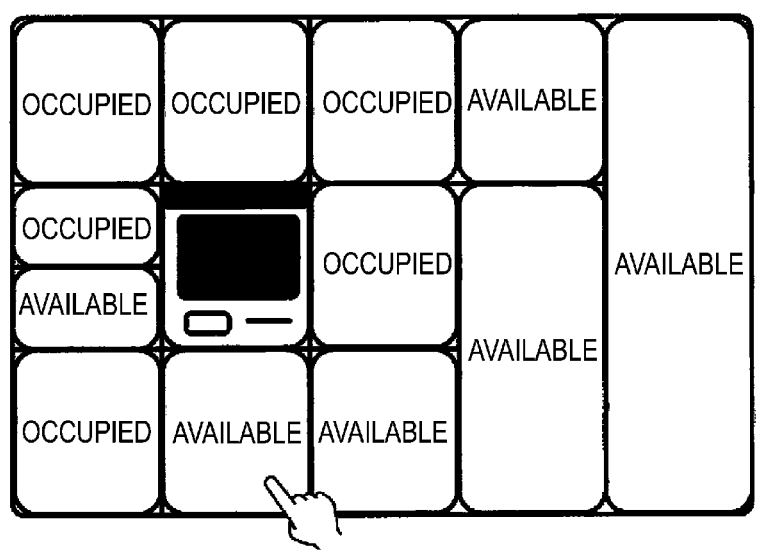
FIG. 9 is a diagram illustrating an example of irregular instantaneous reservation according to an embodiment.

FIG. 9 is a diagram illustrating an example of the irregular instantaneous reservation according to an embodiment. In the irregular instantaneous reservation, one or a plurality of storage boxes 110 are reserved irregularly and instantaneously.

When the business operator terminal 210 receives operation of specifying any one storage apparatus 100 on a map, for example, the server apparatus 300 causes the business operator terminal 210 to display the availability status of each storage box 110 of the storage apparatus 100 at this time point as illustrated in FIG. 9. The business operator terminal 210 receives operation of specifying any one available storage box 110. The business operator terminal 210 receives operation of specifying a type of business.

The server apparatus 300 immediately reserves the specified storage box 110 of the specified storage apparatus 100 according to the reservation details specified in the reservation request from the business operator terminal 210 regarding the time slot corresponding to the current time. Note that it is assumed that the storage boxes 110 already reserved cannot be reserved.

Note that specifying a specific storage apparatus may be changed to specifying a specific area (district). In this case, the server apparatus 300 may preferentially reserve the storage box(es) 110 having a low usage fee out of the plurality of storage boxes 110 present in the specified area.

Example of Function Switch Operation of Storage Box

Next, an example of function switch operation according to an embodiment will be described.

In the server apparatus 300, the controller 320 manages the reservation information including information (business type information) indicating the type of business of the business operator that has reserved the storage box 110. The controller 320 identifies the type of business of the business operator that has reserved the storage box 110 regarding the time slot corresponding to the current time, based on the reservation information.

In the server apparatus 300, the storage 330 stores a function switch table in advance, in which types of businesses and details of function switch are associated with each other. The controller 320 performs function switch of the storage box 110 according to the type of business of the business operator that has reserved the storage box 110, in accordance with the function switch table. FIG. 10 is a diagram illustrating an example of the function switch table according to an embodiment.

As illustrated in (A) of FIG. 10, in the function switch table, the courier service business operator is associated with detection function: on (enabled), temperature adjustment function: off (disabled), and display function: on. Note that, when at least one of the type of article delivered by the courier service business operator or the type of delivery is included in the reservation information, the controller 320 may enable the temperature adjustment function, based on at least one of the type of article (package) or the type of delivery. For example, when the type of article (package) is raw food or fruit, the controller 320 may enable the temperature adjustment function (specifically, a cooling function). Alternatively, when the type of delivery is a refrigerated courier service, the controller 320 may enable the temperature adjustment function (specifically, a cooling function).

In the function switch table, the courier service business operator is associated with detection configuration #1 and display configuration #1. Detection configuration #1 includes a detection threshold value determined according to the weight of a package in general. Note that, when the reservation information includes information of a package weight (or a package size), the controller 320 may switch the detection threshold value, based on the information. For example, the controller 320 sets the detection threshold value to be lower as the package weight is lighter (or the package size is smaller). Display configuration #1 includes at least one of a letter(s), a figure, a symbol, or a picture representing the courier service business operator.

As illustrated in (B) of FIG. 10, in the function switch table, the dry cleaning business operator is associated with detection function: on, temperature adjustment function: off, and display function: on. In the function switch table, the dry cleaning business operator is associated with detection configuration #2 and display configuration #2. Detection configuration #2 includes a detection threshold value determined according to the weight of a garment in general. Note that, when the reservation information includes information of a type of garment, the controller 320 may switch the detection threshold value, based on the information. For example, the controller 320 sets the detection threshold value to be lower as the weight of the garment is lighter. Display configuration #2 includes at least one of a letter(s), a figure, a symbol, or a picture representing the dry cleaning business operator.

As illustrated in FIG. 10(c), in the function switch table, the restaurant business operator is associated with detection function: on, temperature adjustment function (specifically, a heating or heat retaining function): on, and display function: on. In the function switch table, the restaurant business operator is associated with detection configuration #3 and display configuration #3. Detection configuration #3 includes a detection threshold value determined according to the weight of food and drink in general. Display configuration #3 includes at least one of a letter(s), a figure, a symbol, or a picture representing the restaurant business operator.

As illustrated in FIG. 10(d), in the function switch table, the real estate business operator is associated with detection function: on, temperature adjustment function: off, and display function: on. In the function switch table, the real estate business operator is associated with detection configuration #4 and display configuration #4. Detection configuration #4 includes a detection threshold value determined according to the weight of a key in general. Display configuration #4 includes at least one of a letter(s), a figure, a symbol, or a picture representing the real estate business operator.

Figure 11:
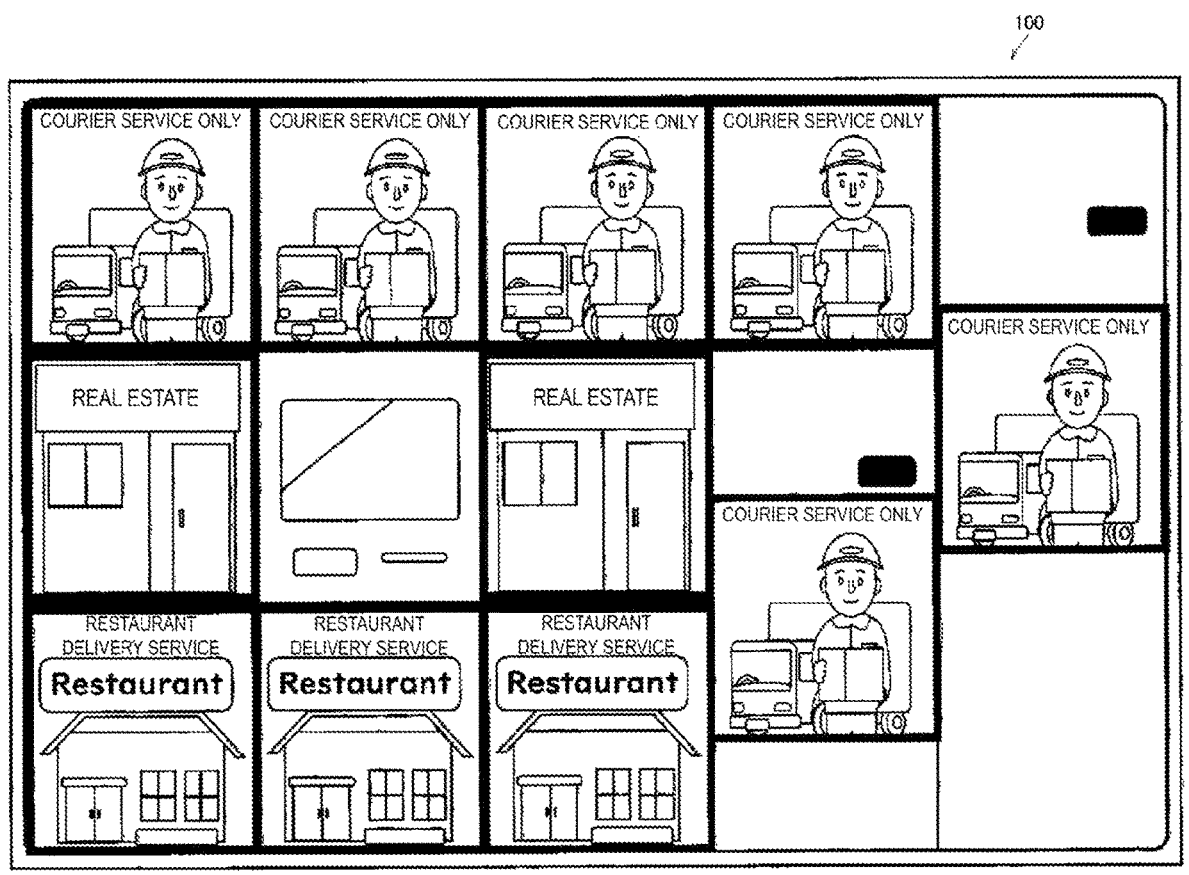
FIG. 11 is a diagram illustrating an information display example in each storage box according to an embodiment.

FIG. 11 is a diagram illustrating an information display example in each storage box 110 according to an embodiment.

As illustrated in FIG. 11, the individual display 115 of each storage box 110 displays information indicating for what purpose the storage box 110 is currently used, under control of the server apparatus 300. FIG. 11 illustrates an example in which, among a total of eleven storage boxes 110, six storage boxes 110 are currently assigned to the courier service business operator, two storage boxes 110 are currently assigned to the real estate business operator, and three storage boxes 110 are currently assigned to the restaurant business operator.

Example of Operation Sequence

Figure 12:
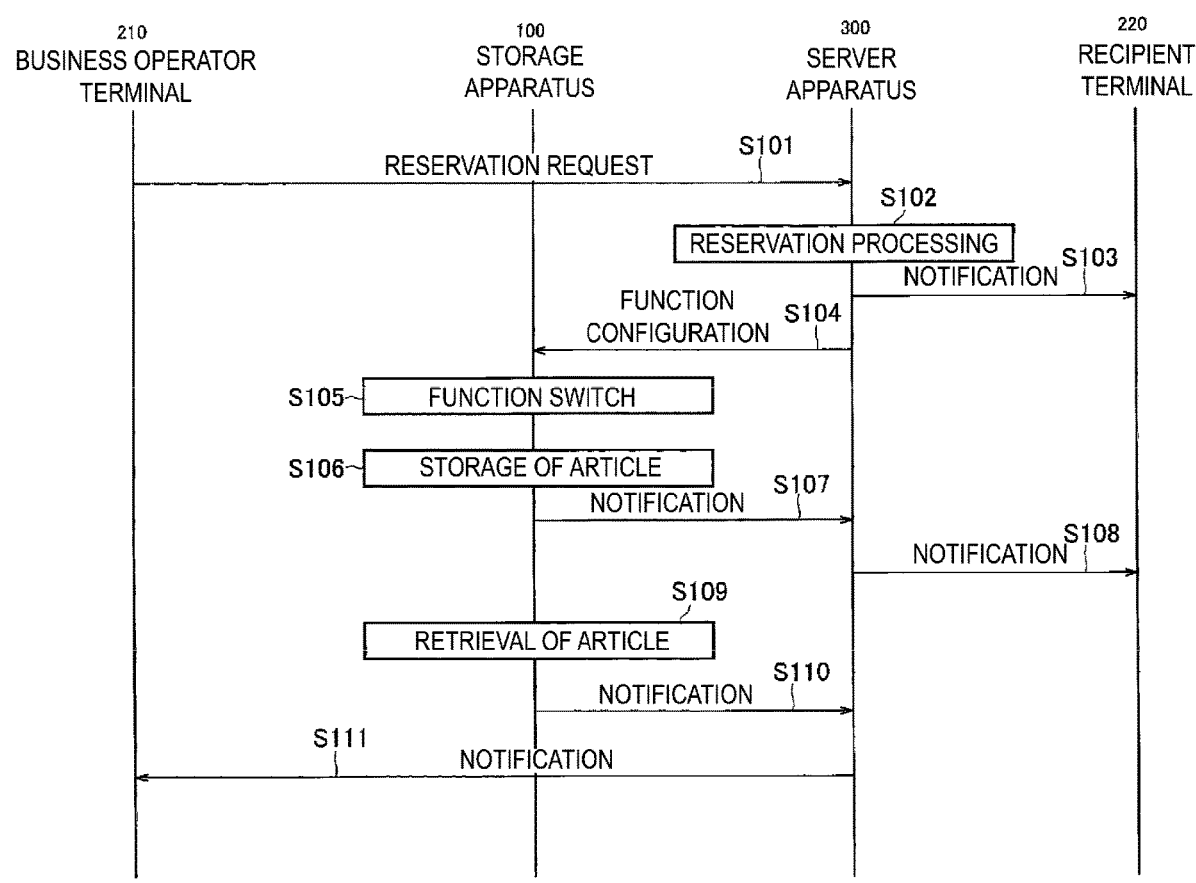
FIG. 12 is a diagram illustrating an example of an operation sequence of the management system according to an embodiment.

Next, an example of an operation sequence of the management system 1 according to an embodiment will be described. FIG. 12 is a diagram illustrating an example of the operation sequence of the management system 1 according to an embodiment.

As illustrated in FIG. 12, in Step S101, the business operator terminal 210 transmits a reservation request including reservation details to the server apparatus 300.

In Step S102, the server apparatus 300 reserves the storage box 110 of the storage apparatus 100 in response to the reservation request received from the business operator terminal 210 and updates the status of the storage box 110 to "reserved".

In Step S103, the server apparatus 300 transmits a notification indicating that the storage box 110 has been reserved to the recipient terminal 220. Note that such a notification may be transmitted from the business operator terminal 210 to the recipient terminal 220.

In Step S104, when time reaches the time slot in which the storage box 110 is reserved, the server apparatus 300 performs function configuration according to the type of business of the business operator that has reserved the storage box 110, for the storage apparatus 100 (storage box 110). Here, the server apparatus 300 may instruct the storage apparatus 100 to lock the storage box 110.

In Step S105, the storage apparatus 100 performs function switch in accordance with the function configuration from the server apparatus 300.

In Step S106, the storage apparatus 100 detects that the door of the storage box 110 is opened and an article is stored. Then, when the door of the storage box 110 is closed, the storage apparatus 100 locks the door of the storage box 110.

In Step S107, the storage apparatus 100 transmits a notification indicating that the article has been stored in the storage box 110 to the server apparatus 300.

In Step S108, the server apparatus 300 transmits a notification indicating that the article has been stored in the storage box 110 to the recipient terminal 220. Note that such a notification may be transmitted from the business operator terminal 210 to the recipient terminal 220.

In Step S109, the storage apparatus 100 detects that the door of the storage box 110 is opened and the article is retrieved.

In Step S110, the storage apparatus 100 transmits a notification indicating that the article has been retrieved from the storage box 110 to the server apparatus 300.

In Step S111, the server apparatus 300 transmits a notification indicating that the article has been retrieved from the storage box 110 to the business operator terminal 210.

Other Embodiments

The embodiments described above describe an example in which function switch of the storage box 110 is initiated by the server apparatus 300. However, function switch of the storage box 110 may be initiated by the storage apparatus 100. For example, the storage apparatus 100 stores the function switch table of FIG. 10 in advance. In Step S104 of FIG. 12, the server apparatus 300 transmits corresponding reservation information to the storage apparatus 100. The storage apparatus 100 performs function switch of the storage box 110 by using the function switch table, based on the business type information included in the reservation information from the server apparatus 300.

A program that causes a computer to execute each of the processing operations according to the embodiments described above may be provided. The program may be recorded in a computer readable medium. Use of the computer readable medium enables the program to be installed on a computer. Here, the computer readable medium on which the program is recorded may be a non-transitory recording medium. The non-transitory recording medium is not particularly limited, and may be, for example, a recording medium such as a CD-ROM or a DVD-ROM.

Embodiments have been described above in detail with reference to the drawings, but specific configurations are not limited to those described above, and various design modifications can be made without departing from the gist of the present disclosure.

The invention claimed is:

1. A management system comprising:
a storage apparatus comprising at least one storage box configured to store an article;
a server apparatus configured to manage the storage apparatus; and
a controller provided in the storage apparatus or the server apparatus, wherein
the at least one storage box is shared by business operators of a plurality of types of businesses, and
the controller is configured to
automatically switch, in response to a reservation request by a business operator to reserve the at least one storage box, and based on a type of business of the business operator using the at least one storage box, at least one of a function to be enabled out of a plurality of functions comprised in the at least one storage box or a configuration in the function to be enabled, and
control the at least one storage box based on the function to be enabled or the configuration in the function to be enabled.

2. The management system according to claim 1, wherein
the server apparatus is configured to manage reservation information comprising information indicating the type of business of the business operator that has reserved the at least one storage box, and
the controller is configured to identify, based on the reservation information, the type of business of the business operator.

3. The management system according to claim 2, wherein
the plurality of functions comprise a detection function of detecting presence or absence of an article stored in the at least one storage box, and
the controller is configured to switch, based on the type of business of the business operator being identified, a configuration related to the detection function.

4. The management system according to claim 3, wherein
the detection function comprises a weight measurement function of measuring weight of the article stored in the at least one storage box, and
the controller is configured to switch, based on the type of business of the business operator being identified, a configuration of a detection threshold value to detect presence or absence of the article by using the weight measurement function.

5. The management system according to claim 2, wherein
the plurality of functions comprise a temperature conditioning function of conditioning temperature in the at least one storage box, and
the controller is configured to switch, based on the type of business of the business operator being identified, between whether to enable the temperature conditioning function.

6. The management system according to claim 5, wherein
the controller is configured to enable the temperature conditioning function when the type of business of the business operator being identified is a type of business dealing with food as the article.

7. The management system according to claim 1, wherein
the plurality of functions comprise a display function of displaying information, and
the controller is configured to switch, based on the type of business of the business operator being identified, a display configuration in the display function.

8. The management system according to claim 7, wherein
the controller is configured to switch the display configuration to allow display of identification information indicating the type of business of the business operator being identified.

9. The management system according to claim 1, further comprising
a plurality of storage apparatuses installed at positions different from each other, wherein
the server apparatus is configured to calculate, based on a usage status of each of the plurality of storage apparatuses or a usage status of the at least one storage box of each of the plurality of storage apparatuses, a usage rate for each of the plurality of storage apparatuses or for each of the at least one storage box.

10. The management system according to claim 9, wherein
the server apparatus is configured to configure, based on the usage rate, a usage fee regarding each of the plurality of storage apparatuses.

11. The management system according to claim 9, wherein
the server apparatus is configured to preferentially reserve, when the server apparatus receives a reservation request with a specified area from a business operator of any one of the plurality of types of businesses and two or more storage apparatuses are installed in the specified area, the at least one storage box of a storage apparatus with the usage rate being lower out of the two or more storage apparatuses.

12. A server apparatus comprising:
a controller configured to manage a storage apparatus comprising at least one storage box configured to store an article, wherein
the at least one storage box is shared by business operators of a plurality of types of businesses, and
the controller is configured to
automatically switch, in response to a reservation request by a business operator to reserve the at least one storage box, and based on a type of business of the business operator using the at least one storage box, at least one of a function to be enabled out of a plurality of functions comprised in the at least one storage box or a configuration in the function to be enabled, and
control the at least one storage box based on the function to be enabled or the configuration in the function to be enabled.

13. A storage apparatus comprising:
at least one storage box configured to store an article; and
a controller, wherein
the at least one storage box is shared by business operators of a plurality of types of businesses, and
the controller is configured to
automatically switch, in response to a reservation request by a business operator to reserve the at least one storage box, and based on a type of business of the business operator using the at least one storage box, at least one of a function to be enabled out of a plurality of functions comprised in the at least one storage box or a configuration in the function to be enabled, and
control the at least one storage box based on the function to be enabled or the configuration in the function to be enabled.

14. A management method used for a management system comprising a storage apparatus comprising at least one storage box configured to store an article, a server apparatus configured to manage the storage apparatus, and a controller provided in the server apparatus or the storage apparatus,
the at least one storage box being shared by business operators of a plurality of types of businesses, the management method comprising:
automatically switching, by the controller, in response to a reservation request by a business operator to reserve the at least one storage box, and based on a type of business of the business operator using the at least one storage box, at least one of a function to be enabled out of a plurality of functions comprised in the at least one storage box or a configuration in the function to be enabled; and
controlling the at least one storage box based on the function to be enabled or the configuration in the function to be enabled.

* * * * *